(12) United States Patent
Enserink (10) Patent No.: US 12,233,607 B2
(45) Date of Patent: Feb. 25, 2025

(54) PROCESS FOR MANUFACTURING OF FREE FORM INFLATABLE BODIES

(71) Applicant: Shapewave group B.V., Oostvoorne (NL)

(72) Inventor: Anton Rudolf Enserink, Oostvoorne (NL)

(73) Assignee: Shapewave group B.V., Oostvoorne (NL)

( * ) Notice: Subject to any disclaimer, the term of this patent is extended or adjusted under 35 U.S.C. 154(b) by 198 days.

(21) Appl. No.: 17/906,760

(22) PCT Filed: Mar. 23, 2021

(86) PCT No.: PCT/EP2021/025114
§ 371 (c)(1),
(2) Date: Sep. 20, 2022

(87) PCT Pub. No.: WO2021/190789
PCT Pub. Date: Sep. 30, 2021

(65) Prior Publication Data
US 2023/0211563 A1    Jul. 6, 2023

(30) Foreign Application Priority Data
Mar. 25, 2020   (NL) ..................... 1043609

(51) Int. Cl.
*B29C 65/08* (2006.01)
*A47C 27/08* (2006.01)
(Continued)

(52) U.S. Cl.
CPC ............ *B29C 65/08* (2013.01); *A47C 27/081* (2013.01); *B29C 65/06* (2013.01);
(Continued)

(58) Field of Classification Search
CPC ........ B29C 70/38; B29C 70/388; B29C 65/78
See application file for complete search history.

(56) References Cited

U.S. PATENT DOCUMENTS 3,106,373 A    10/1963 Bain
3,265,854 A  *  8/1966 Bliven ............... B23K 11/0093
                                                           219/78.12
(Continued)

FOREIGN PATENT DOCUMENTS

CN    102923298 A    2/2013
EP       2674071 A1  12/2013
(Continued)

OTHER PUBLICATIONS

Satake, Y., A. Takanishi, H. Ishii, Novel Growing Robot With Infltable Structure and Heat-Welding Rotation Mechanism, IEEE/ ASME Transactions on Mechatronics, vol. 25, No. 4 (Aug. 2020), pp. 1869-1877. (Year: 2020).*
(Continued)

*Primary Examiner* — Matthew J Daniels
(74) *Attorney, Agent, or Firm* — Rogowski Law LLC (57) ABSTRACT

Process for manufacturing inflatable bodies capable of assuming a desired complexly curved shape comprising two, around their circumference hermetically bonded opposing membranes (3, 4), which are internally linked by a plurality of link tapes (1), which tapes are bonded at an exact length and inclination angle at an exactly determined position. By numerical instructions, a continuous tape is fed and bonded alternately on the insides of the membranes by means of a roboticized tape positioning head, creating bond lines (2) between the tape and a membrane. Any fold occurring through local inclination, or planar angle variation of the tape relative to a membrane is kept between two bond lines on a membrane (3,4). A roboticized tape positioning and bonding head inside, and a bond activation head outside of
(Continued)

a membrane can position relative to a membrane (3,4) by means of printed positioning marks, optical and proximity sensors to create the bond lines (2).

17 Claims, 4 Drawing Sheets

(51) Int. Cl.
| | |
|---|---|
| B29C 65/00 | (2006.01) |
| B29C 65/06 | (2006.01) |
| B29C 65/14 | (2006.01) |
| B29C 65/48 | (2006.01) |
| B29C 65/78 | (2006.01) |
| B29D 22/02 | (2006.01) |
| B29L 22/02 | (2006.01) |
| B29L 31/30 | (2006.01) |

(52) U.S. Cl.
CPC .......... *B29C 65/1406* (2013.01); *B29C 65/48* (2013.01); *B29C 65/7817* (2013.01); *B29C 66/1122* (2013.01); *B29C 66/472* (2013.01); *B29C 66/7292* (2013.01); *B29C 66/81431* (2013.01); *B29C 66/81435* (2013.01); *B29C 66/81463* (2013.01); *B29C 66/8432* (2013.01); *B29C 66/863* (2013.01); *B29C 66/98* (2013.01); *B29D 22/02* (2013.01); *B29L 2022/02* (2013.01); *B29L 2031/3076* (2013.01)

(56) References Cited

U.S. PATENT DOCUMENTS

| | | | |
|---|---|---|---|
| 6,199,796 | B1 | 3/2001 | Leutert |
| 6,644,535 | B2* | 11/2003 | Wallach ............... B23K 11/008 |
| | | | 228/178 |
| 2005/0166744 | A1* | 8/2005 | Berge .................... B26D 5/005 |
| | | | 83/879 |
| 2015/0147925 | A1 | 5/2015 | Klare |
| 2020/0031434 | A1* | 1/2020 | Pouchkarev ........... B63B 32/66 |
| 2020/0114588 | A1* | 4/2020 | Wang .................... B29C 65/02 |
| 2020/0352347 | A1 | 11/2020 | Lin |

FOREIGN PATENT DOCUMENTS

| | | |
|---|---|---|
| GB | 2167710 A | 6/1986 |
| WO | 9803398 A1 | 1/1998 |
| WO | 0004256 A1 | 1/2000 |
| WO | 2008040133 A1 | 4/2008 |
| WO | 2009143002 A2 | 11/2009 |
| WO | 2013164360 A1 | 11/2013 |
| WO | 2018205910 A1 | 11/2018 |

OTHER PUBLICATIONS

H. Sareen, U. Umapathi, P. Shin, Y. Kakehi, J. Ou, P. Maes, H. Ishii, Printflatables: Printing Human-scale, Functional and Dynamic Inflatable Objects, CHI 2017, Denver, CO (2017), pp. 3669-3680 (Year: 2017).*

* cited by examiner

PROCESS FOR MANUFACTURING OF FREE FORM INFLATABLE BODIES

CROSS-REFERENCE TO RELATED APPLICATIONS

This application is a national stage application (under 35 USC § 371) of PCT/EP2021/025114, filed Mar. 23, 2021, which claims benefit of NL 1043609, filed Mar. 25, 2020, the contents of each of which is incorporated by reference herein.

FIELD OF THE INVENTION

The present invention relates to a process for manufacturing complexly curved shapes such as airfoils, streamlined nacelles and curved panels that have all the known advantages of inflatable bodies without the usual shape constraints—they tend to be spherical, conical or flat—found in nowadays inflatable products. Bodies manufactured according to the invention have great rigidity and can typically have shapes with double curvature and varying thicknesses. Also, bodies manufactured according to the invention are lighter and stow more compact than currently applied methods. The manufacturing process according to the invention is highly automated and applies for a wide variety of products at low costs for both startup and serial production.

DESCRIPTION OF RELATED ART

Inflatable bodies have since long found their way in everyday use. Structural inflatable elements are also widely used, for instance in air-frames for kites and as panels in floating docks.

Inflatable bodies keep their shape and rigidity by benefiting from the isostatic pressure of the gas on the inside of the body, that is higher than the surrounding atmosphere, combined with the stiffness of their skins. The best suitable materials for constructing structural inflatable elements are fabrics that have a high stiffness in all directions. Due to the isostatic nature of the internal pressure, these structures will try to assume spherical or conical shapes upon inflation, as their skins can only hold hoop stresses. In order to create shapes other than spherical or conical, multiple inflatable elements can be joined, for instance a raft can be made by a parallel assembly of multiple inflatable tubes. Tubular inflatable structural elements commonly have a double skin construction, wherein the outer skin is a fabric construction that doesn't necessarily need to be airtight, as the inner skin is an airtight bladder. The outer skin can thus be stitched to create the required conical shape and for joining adjacent construction.

The voids between adjacent circular sections of inflatable bodies assembled from parallel inflatable tubes may compromise the function of such bodies, for instance increased aerodynamic or hydrodynamic drag, lack of transverse rigidity or an unstable standing surface. A commonly known construction method spans the parallel inflatable tubes with an outer skin that is either filled with gas at a second, lower pressure level, foam or a granular material, the latter of which is described in WO2013164360A1, S. Klare et al. The spanning methods herein described either lack stability, or increase the bulk of the inflatable body in deflated storage state. Also, in case of foam or grain filled voids, the overall weight of the inflatable body is compromised.

Other commonly used methods for creation of planar inflatable bodies are by joining opposing membranes of the inflatable body internal to a pressurized chamber with joining elements such as fabric panels or thread. These methods are mostly applied to single skin bodies, as an inner skin, or bladder, would be very complex. The joining elements are open to allow the pressure to spread evenly inside the inflatable body. One way of joining the opposing surfaces is by gluing or welding internal panels to the inside of the opposing surface of the inflatable body. This way, the skin is not pierced so an airtight construction is possible. One can understand that such structures will have an undulating outside appearance, as the surface portions between the internal joining elements will assume a spherical or conical shape upon inflation. Also, the stiffness of the inflatable element is depending on the number of internal joints between the opposing outer skins, the further these joints are apart, the lower the resistance to buckling of the inflatable body is. There are practical bounds to the pitch of these internal panels, and therewith the allowed pressure, therefore the structural use of such internally paneled inflatable bodies is limited.

One such construction is known from GB 2167710A, Keith Steward, which describes an inflatable body with internal linking elements that are ruffed over a set of forms during assembly. While this method provides some level of curvature to the inflatable shape, the orientation and position of the linking elements need to allow for removal of the set of forms after assembly of the linking elements, therewith severely restricting the orientation and positioning options and design freedom of the inflatable body. This method is further deemed unpractical as, for achieving a high density pattern of the linking elements required for a smooth surface and stiff construction, an extremely large number of high and narrow forms will be required. Furthermore, such a set of forms will be costly to make while its use is restricted to building one design.

Using a multitude of closely pitched threads as internal joining means between two opposing membranes of an inflatable body can solve the above mentioned buckling issues while creating a reasonably flat appearance of the outer faces. Inflatable bodies made according to the popular "drop stitching" process have closely pitched threads and allow for much higher pressure levels than internally paneled inflatable bodies. The drop stitch manufacturing process starts with an intrinsically leaking construction as its core consists of woven panels that are interconnected with threads the length of the final thickness of the drop stitched panel. These bodies are made airtight from the outside, by applying a layer of leak stopping caulk and usually a second skin laminated to the outside to protect the coating and to provide additional stiffness. For inflatable bodies that need a slight bend, like rockered surf boards, such second skins are applied while the inflatable body is held in a bent shape.

Due to the airtight coating and additional laminated skins, drop-stitched inflatable bodies are quite heavy compared to other inflatable structures. One can understand that the outside leak stopping method involves a high risk of delamination and subsequent leaking. Also, the drop stitching process allows only for flat, constant thickness shapes.

There are, however, numerous examples of structural inflatable bodies with more complex contours, and even free form shapes. Inflatable airplane and kite wings have been built by a longitudinal array of inflatable tubes of varying diameter, encapsulated by an outer skin, and by, mostly open, transverse cells formed by internal panels that are tapered towards the leading and trailing edge, all to assume a desired aerodynamic foil. Because the opposing membranes of each segment will assume a tubular, spherical or conical shape, these wings appear undulated on the outer surfaces, which induces high aerodynamic drag and compromises performance.

If the function of the inflatable structure is to move through a medium, like a fuselage, hull or wing, the undulation patterns are oriented favorably to reduce drag and flow disturbance caused by the undulations.

An exception to the above mentioned undulated wings is described in U.S. Pat. No. 3,106,373, BK Bain et al., where a wing construction is disclosed consisting of a top and bottom skin made from a drop stitched panel called Airmat, with a vertical beam of the same at the airfoil apex. The top skin is woven in the airfoil shape by using a converted loom. The skin mats and beam are be inflated to created sufficient stiffness. This construction method provides a controlled and rigid inflatable body with a sufficiently smooth outer skin.

Having to build or convert a loom specifically for one shape however seems to be cost ineffective. As with most other methods described in the above, the shape is limited to single curvature. Further, this, and similar methods will result in a relatively high weight, and large stowing bulk when deflated.

CN102923298A describes an air foil construction with ribs formed by a sectional upper and lower contour tapes interconnected with a plurality of link tapes of varying lengths, which, if the ribs are really close to each other, and the distribution of link tapes is really high, would result in a sufficiently smooth outer surface in case the contour tapes are situated relatively close to each other. A person skilled in the art can see such a working method is circuitous and would bring along high manufacturing costs.

Most of the cited references above attempt to apply a contoured shape to an inflatable body by setting the local spacing between two membranes by applying variation to the length of the linking elements prior to or during assembly. One exception thereof is described in WO 2009/143002A2, Rapaport & Davidson. This publication describes a method of making contoured, liquid filled shock absorbing shoe soles by applying a hot pressing to a flat or wedge-shaped sheet consisting of outer membranes and internal linking elements. By a combination of heat and pressure the linking elements can assume a new length dictated by the mold shape, thus providing a free form shape to the sole. This method is highly suitable for manufacturing high quantities of identical parts, when amortizing of pressing tools allows for a considerable investment per design. The materials suitable for such process cannot benefit from embedded fibers with low elasticity, as found in coated fabrics, making it less suitable for pressurized inflatables requiring stiffness. Furthermore, for reasons of practicality and costs, the dimensions of a design manufactured according to such a method will be limited in both height and area.

SUMMARY OF THE INVENTION

The present invention provides a process for manufacture of double curvature single skin inflatable bodies with high rigidity, low weight, and low manufacturing costs, with a good level of control over the outer skin smoothness, without the use of design specific molds or forms.

For a good understanding of the invention, it needs to be noted, that the number of link elements between two opposing membranes forming an inflatable body, needed to achieve sufficient smoothness and rigidity, is in most cases very high. To give an idea, an imaginary section of a 10 cm thick, 1 m² flat inflatable body according to the invention, having 1 cm wide link tapes pitched 1 cm apart in both directions, would have 50 rows of 100 link tapes, resulting in 5,000 link tapes, with a total of 10,000 bond lines. 12 cm long link tapes for such a construction involve 6 m² of link tape. Added 2 m² of membrane area, this imaginary 1 m² section build from 430 g/m², 235Dtx nylon/TPU membrane would weigh around 3.5 kg. An averagely sized inflatable stand up paddle board, or SUP, built according to such construction, with grip deck, valve and fin would weigh about 4.5 kg, which is roughly a quarter of the weight of a comparable drop stitch inflatable SUP, would pack significantly smaller, has better durability and a shape better adapted to its purpose.

The process according to the invention allows for manufacturing inflatable bodies comprising two opposing outer membranes interconnected by a plurality of precisely positioned internal link tapes that are at the ends bonded to said membranes, with the resulting bond lines defined in distance along the tape center line, planar alignment to the membrane and inclination, all in order to let the inflatable body assume a predetermined shape upon inflation.

The tape bond lines are distributed over the opposing membranes in such a way that the inflated bodies achieve the desired surface smoothness and rigidity upon inflation. Parameters for adequate calculation of said distribution, among others, include local and global membrane offset, inflation pressure, membrane and link tape physical properties, bond strength, required outer face smoothness and construction loads. Due to the plurality of link tapes and complexity of said parameters, computer algorithms involving finite element analysis can assist in modeling the tape bond line distribution. In general, more link tapes result in higher rigidity and smoother outer faces. Comparing distribution models with different link tape widths, distribution densities and material properties is extremely helpful for determining the optimal weight, quality and cost of the inflatable body according to the invention.

The bond line distribution can include a designed variation of planar orientation angle offsets, in order to utilize the planar stiffness of each link tape to achieve a desired rigidity pattern in the inflatable body according to the invention by reducing shear in preferred directions.

In case the opposing membranes are made from flat stock material, a membrane can be an assembly of panels to achieve an approximation of a desired double curvature shape. Membrane panels may also be assembled from materials with different properties in order to efficiently allot areas requiring higher strength, stiffness or mass, another color, photovoltaic properties and electrical or heat conductivity. A first embodiment of an inflatable body construction according to the invention has a continuous feed of link tape that is cut to length following each bond line activation. The bond lines on each end may be oblique to the tape center line to follow the local inclination of the opposing membranes.

In another embodiment of such a construction, the link tapes are not cut after each bond line activation, but bonded to the opposing membranes in a corrugating fashion, with a bond to one of said membranes at each nadir and the other said membranes at each apex, with the tape sections between bonding assuming a straightened shape upon inflation.

An embodiment similar to the above has sets of two bond lines at each nadir and apex of a corrugating link tape, and a length of excess link tape longer than the distance between those two bond lines folded between said bond lines, specifically if said excess length has a trapezoid shape as a result of an inclination of a membrane at each of said two bond lines, or an offset in planar orientation angle. This particular embodiment has a double amount of bond lines which reduces the pulling force on each bond line, and increases the smoothness of the outer faces of the inflatable body. Another advantage of this double bond line method is that the link tape does not need to but cut at each bond line, which allows for a simplified tape positioning means in an automated manufacturing process.

The buckled bit of excess link tape between two bond lines can be removed after bonding if desired, to save weight and storage bulk of the inflatable body.

A preferred embodiment of an inflatable body construction method according to the invention uses computer algorithms to calculate optimized link tape distribution, and are further capable of determining panel shapes, circumferential weld lines, clues for further manual or automated handling of the materials, and points for inflation and deflation. Such data can be precisely printed on one or both sides of the opposing membrane panels in the form of lines, markers and text, and an individually coded location marker for each bond line, such codes and markers preferably being readable by a sensor linked to a computer. An embodiment for automated manufacturing of an inflatable body according to the invention, comprises a tape positioning head equipped with a tape feeder for continuous tape, and counter pressing anvil, placed on a robotic arm dedicated to position and bond link tapes on the insides of the opposing membranes of the inflatable body, with sufficient reach and axes of movement to apply the link tape alternately on each inside face of the opposing membranes, and, operating in concert with said tape positioning head, a bond activating head placed on an outside robotic arm with sufficient reach and axes of movement to precisely counter press the opposing membrane material on the outside faces of each opposing membrane against the anvil on the tape positioning head, provided with an ultrasonic welding device equipped with a horn matching the anvil on the tape positioning head. In this embodiment with two parts of a bonding system comprising a bond activation means and a counter pressing anvil, the counter pressing anvil is built to the tape positioning head, and the bond activation means is mounted to the outside robotic arm, in order to keep the dimensions of the tape positioning head as small as possible in order to manufacture inflatable bodies with thin sections where their opposing membranes are close to each other, and the link tapes are short, as is for instance the case with the areas closer to trailing edges of airfoils.

For embodiments for automated manufacturing of an inflatable body according to the invention with inflatable bodies having a large enough section, a bond activation means can be placed on the inside robotic arm.

A preferred embodiment for automated manufacturing of an inflatable body according to the invention comprises a third, also outside, robotic arm equipped with a second bond activation means, so that each outside robotic arm can reach the outside face of one of the opposing membranes of an inflatable body. Such a setup considerably reduces the travel distance of the outside robotic arms, and therewith the manufacturing time of the inflatable body.

In an embodiment for automated manufacturing of an inflatable body according to the invention, the tape positioning head is fitted with a tape feeder having motor driven synchronized pinch rollers that can feed precise lengths of link tape by controlling time and speed of said motor for each feeding action. In order to position and bond the link tapes at an angle oblique to the center line of the link tape, the counter pressing anvil can assume an oblique angle, which angle is controlled by a second motor. This way, a bond line can be made according to the local inclination of a membrane.

An embodiment of an inflatable body construction according to the invention has an automatic cutter fitted to tape position head, able to cut a link tape upon bonding.

Yet another embodiment of an inflatable body construction according to the invention has two counter pressing anvils positioned on each side of a link tape feeding head, in such a way the tape is fed through a slot between said two anvils. Such a dual anvil tape positioning head can be used to position and bond link tape in a corrugating fashion, as with the corrugating the bond side of the link tape will alternate with each crossing between the opposing membranes of the inflatable body.

To compensate for the oblique bond angle of a first bond line, an excess length of link tape is fed through the tape head while the tape positioning head moves to a second bond line location on the same membrane, which bond line will have an oblique angle that is approximately mirrored to said first bond line. The resulting excess link tape between the pair of the first and second bond lines will have a trapezoid shape when unfolded, which will fold between said bond lines. As an option, for instance to reduce weight and storage bulk, one can choose to remove the excess link tape between a pair of bond lines on the same membrane.

For automated manufacturing of an inflatable body according to the invention it is eminent that robotic arms on opposing sides of a membrane are sufficiently aligned, only then correct positioning of a bond line can be achieved. A preferred embodiment of the invention therefore has at least one of a pair of robotic arms fitted with a proximity sensor that locates a paired robotic arm trough the membrane material, with the proximity sensor feeding potential degrees of misalignment back to a computer, which returns information to the robotic arm to adapt its position to achieve the desired alignment.

Yet another embodiment for manufacturing of an inflatable body according to the invention has the robotic head fitted with a sensor capable of reading data printed on the membrane, in order to match positional information to an individual bond line. Such embodiment, combined with capacities provided by any of the above embodiments such as robotic arm proximity sensing, printed data on opposing membranes, tape feeding and bonding means, and a pair of robotic arms, all controlled by a computer algorithm, is capable of automatically assembling link tapes internally to two opposing membranes. An embodiment for manufacturing of an inflatable body according to the invention capable of automatically assembling link tapes internally to two opposing membranes is provided with means for feeding and tensioning the opposing membranes, such means compromising an assembly of opposing tracks that hold each membrane at opposing sections of their circumference. Particularly in case such membranes are assemblies from multiple panels, the suspension of these opposing circumference sections is elastic, for instance by lacing said circumference sections to a plurality of cars running in said opposing tracks. A computer controlled feed motor can push out the next section of the opposing membrane after a section is internally linked with link tape by driving the cars through the tracks.

The preferred assembly direction is vertical, with each new section of link tapes assembled above the last. This way, in particular longer link tapes bonded earlier will sag down and away from the tape feeding robotic arm. Such an embodiment can comprise one or more air guns to blow any jumped up link tape back down with a puff of air to provide an unobstructed work area for the robotic arm.

An embodiment for manufacturing of an inflatable body according to the invention has multiple sets of robotic arms comprising a robotic arm fitted with a link tape positioning head, and at least one robotic arm fitted with a bonding means, with each set having its own feed of continuous link tape. Such sets can operate simultaneously on a section of a large inflatable body, in order to increase manufacturing speed. Such sets can also assemble link tape with different properties and widths in order to manufacture inflatable bodies according to the invention having zones requiring different properties.

Similar to 3D printers and known CNC manufacturing methods, the manufacturing process according to the invention does not rely on "hard tooling" such as pre-made forms, dies or molds, as it solely applies "soft tooling", or numerical computer commands, to prepare and assemble the inflatable bodies. Thus, the present invention provides for design and manufacture of inflatable, complexly curved bodies with high rigidity and surface precision with very low startup costs and short preparation time per design, regardless of the quantities made of a design.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings certain exemplary embodiments of inflatable bodies. It should be understood, however, that the disclosure is not limited to the precise arrangements and instrumentalities shown. In the drawings.

DETAILED DESCRIPTION

Figure 1:
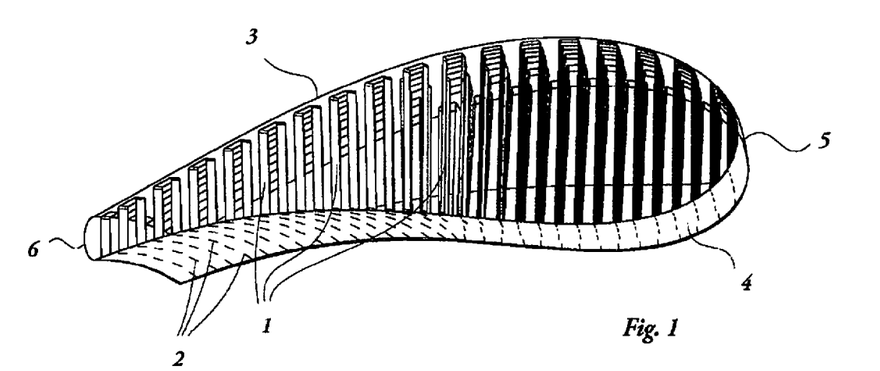
FIG. 1 depicts a cut-away of a double curvature single skin inflatable body according to the invention in inflated condition showing opposing membranes and a plurality of link tapes.

FIG. 1 depicts how a double curvature single skin inflatable body is rigidized and smoothened in a desired shape by means of a plurality of link tapes 1, each link tape section bonded with a bond line 2 to each opposing membrane 3 and 4. The membranes are joined at their contours 5, 6 to create an air tight chamber. As the double curvature of the membranes have a continuously changing inclination, each individual link tape 1 will have bond lines 2 at a local inclination angle relative to the tape center line. The link tapes 1 in this figure are arranged in a corrugating fashion, with excess lengths of link tape left between two consecutive bond lines on a membrane, which eliminates the need for cutting each link tape section after bonding to one of the opposing membranes.

Figure 2:
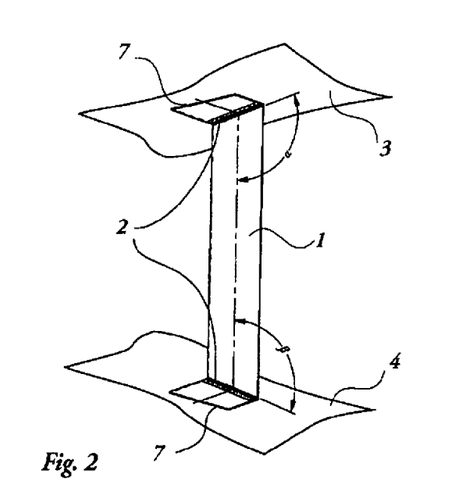
FIG. 2 depicts a single link tape tensioned between two sections of, in the plane of the tape inclining, opposing membranes.

FIG. 2 depicts such inclination angles $\alpha$ and $\beta$ relative to the link tape center line. These angles may be higher or lower than 90°. Note that link tape 1 shown here is cut to length at both cut lines 7 prior to or after bonding. Such cutting can be at a right angle to the link tape center-line, particularly if that is deemed a necessary simplification for automated manufacturing.

Figure 3:
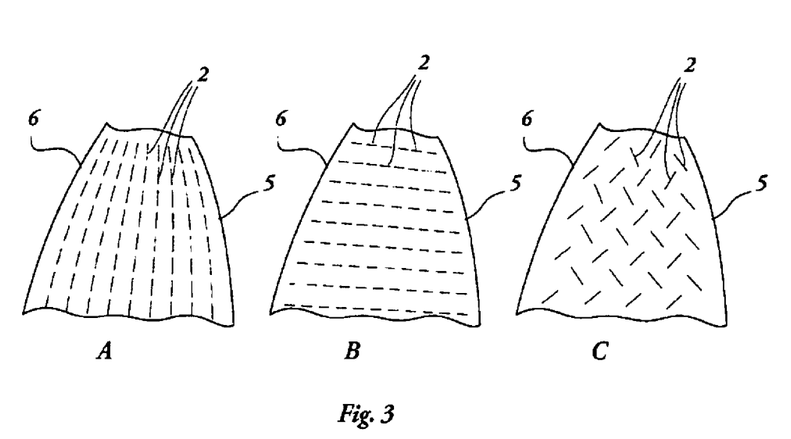
FIGS. 3A, 3B and 3C depict 3 different bond line alignment schemes as projected on a membrane of an inflatable body.

In FIGS. 3A, B and C three different alignment schemes for pluralities of bond lines 2 on sections of membrane with two sections of contour 5 and 6 are depicted. FIG. 3A depicts a longitudinal alignment, which would be useful on for instance an inflatable float of a water craft, as the longitudinal pattern would minimize hydrodynamic flow disturbances. Another benefit of choosing such alignment is the increment of longitudinal stiffness by applying the combined total of all panel stiffnesses of all link tapes in a useful orientation. FIG. 3B depicts a transverse alignment of link tape bond lines 2, which is suitable for, for instance, an airfoil as found in ram-air inflatable kites, or manifold inflatable wings that provide higher rigidity. As the orientation of the bond lines aligns with the air flowing over such airfoils, the aerodynamic flow disturbance is minimized. In order to add rigidity to such inflatable airfoils, external stiffeners such as struts, or bridles, can be added. Internal stiffeners can also be added, for instance by means of tubular air chambers with elevated pressure levels. FIG. 3C depicts a mixed bond line 2 orientation pattern, which adds to omnidirectional rigidity to an inflatable body that can be built in a process according to the invention.

Figure 4:
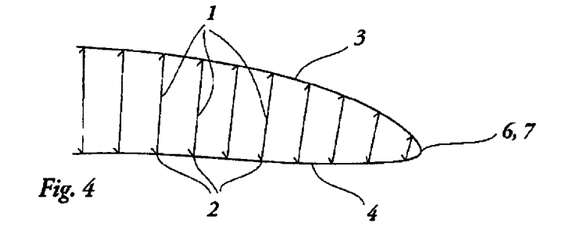
FIG. 4 depicts a partial cross section of an inflatable body with each link tape cut to length.

FIG. 4 depicts a partial cross section of an inflatable body with each link tape 1 cut to length, similar to the link tape 1 depicted in FIG. 2, prior to or after bonding. It is known to persons skilled in the art that cutting a plurality of link tapes 1 to length prior to bonding is highly unpractical and not well suited for automation. It should be understood that the amount of link tapes 1 will be well into the hundreds, if not thousands, in most inflatable bodies built according to the invention. However, in an automated manufacturing process, cutting link tape 1 to length after bonding is possible with a tape positioning and bonding means provided with an automatic cutter.

Figure 5:
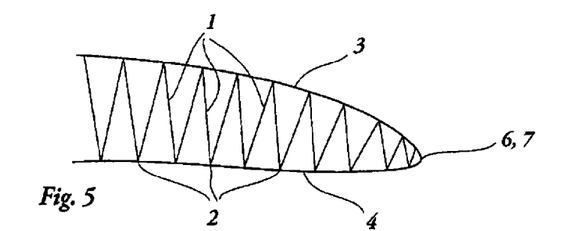
FIG. 5 depicts a partial cross section of an inflatable body with corrugating sections of link tape.

The corrugating link tapes 1 as depicted in FIG. 5 are suitable for inflatable bodies built according to the invention with no or minor local inclination of the opposing membranes, in the plane of the link tape 1. If said inclination is too high, the bond lines of the link tape 1 to the opposing membranes are unevenly tensioned, causing peak stresses in said bond lines and loss of smoothness in the inflated membrane surfaces. Further, corrugating link tape 1 as depicted in FIG. 5 allows for speedy assembly relative to the variations shown in FIGS. 4 and 6 as there's only one bond line 2 per section of link tape 1. It has however a lower bond line count causing relatively low smoothness of the resulting membrane surface upon inflation. This corrugating link tape further increases the pulling load on the bond lines 2, as two link tapes 1 are pulling the same bond line 2.

Figure 6:
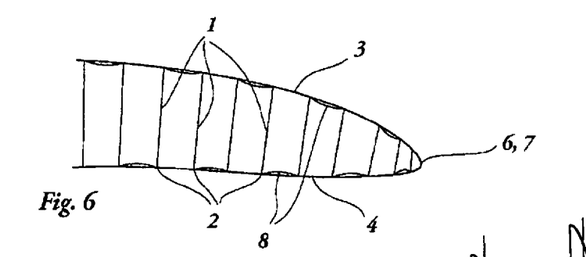
FIG. 6 depicts a partial cross section of an inflatable body with corrugating sections of link tape, in an embodiment with double bond lines that allow inclination of the opposing membranes in the link tape plane, and variation of bond line alignment in the plane of a membrane.
Figures 7, 8:
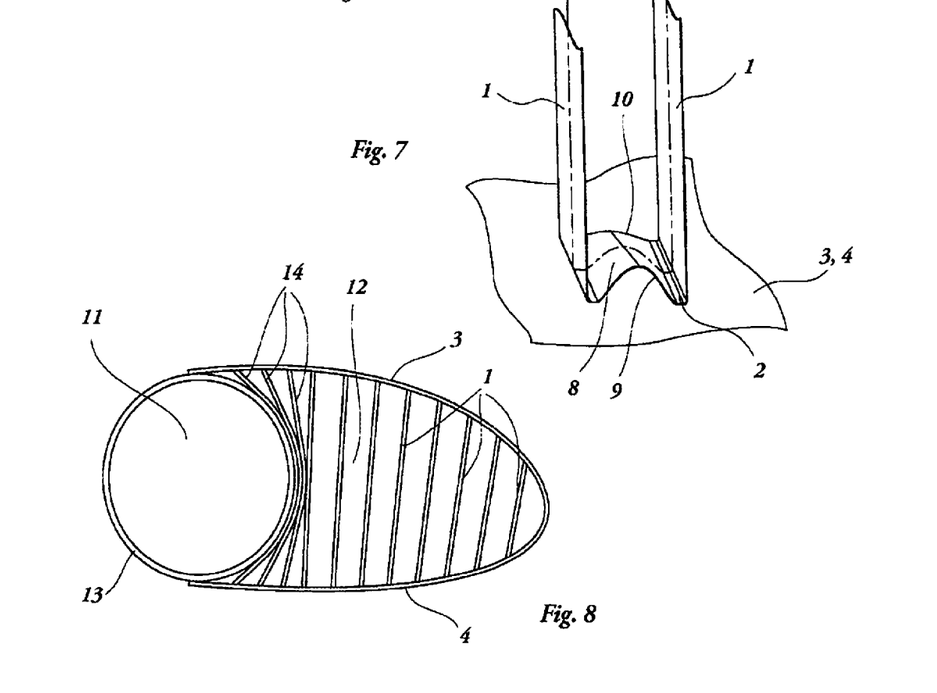
FIG. 7 depicts two sections of link tape having two bond lines and a trapezoid section of excess link tape left folded between the bond lines.
FIG. 8 depicts a partial cross section of an inflatable body comprising two differently pressured chambers, of which one has a circular section, and another a plurality of link tapes, of which some partly follow the sectional shape of the higher pressured circular sectioned chamber.

FIG. 6 depicts a partial cross section of an inflatable body with corrugating sections of link tape, in a version with double bond lines that allow for both an inclination of the opposing membranes 3, 4 in the link tape plane, and angular variation in the bond lines in the plane of a membrane, with each section of excess link tape 8 between two bond lines 2 on one of the opposing membranes allowed to fold away from said membrane, as further laid out in FIG. 7.

FIG. 7 shows that such a section of excess link tape 8 can fold unevenly with one edge 9 folding out higher than its opposing side 10, as said section 8 likely has a trapezoid shape due to the local inclination of the opposing membranes 3, 4 as depicted in FIG. 2 by angles $\alpha$ or $\beta$, or angular variation of the bond lines 2 in the plane of a membrane as depicted in FIG. 3C.

FIG. 8 depicts an inflatable body according to the invention having a first air tight chamber 11 having circular sections joined to a second air tight chamber 12 having single or double curvature opposing membranes 3, 4 held in shape by a plurality of internal link tapes 1. Air chambers 11 and 12 may be pressurized differently, for instance circular sectioned chamber 11 can be pressurized at a significantly higher pressure as the resulting hoop loads of such pressure are running tangential to its membrane 13. Due to the high pressure, a rigid structural element is formed by such chamber 11 that, in combination with the second air tight chamber 12 having single or double curvature, a rigid inflatable body is formed with a desired single or double membrane curvature. Multiple differently pressurized air tight chambers can be assembled to build rigid inflatable bodies like hulls, wings, rotors and sails. FIG. 8 further depicts a number of link tapes 14 that partly wrap around a circular section of air chamber 11 membrane 13, with their lengths precisely adjusted to provide a smooth outer surface of the sections of membranes 3 and 4 of air chamber 12 adjacent to air chamber 11, upon inflation of both air chambers.

Figures 9, 10, 11, 12:
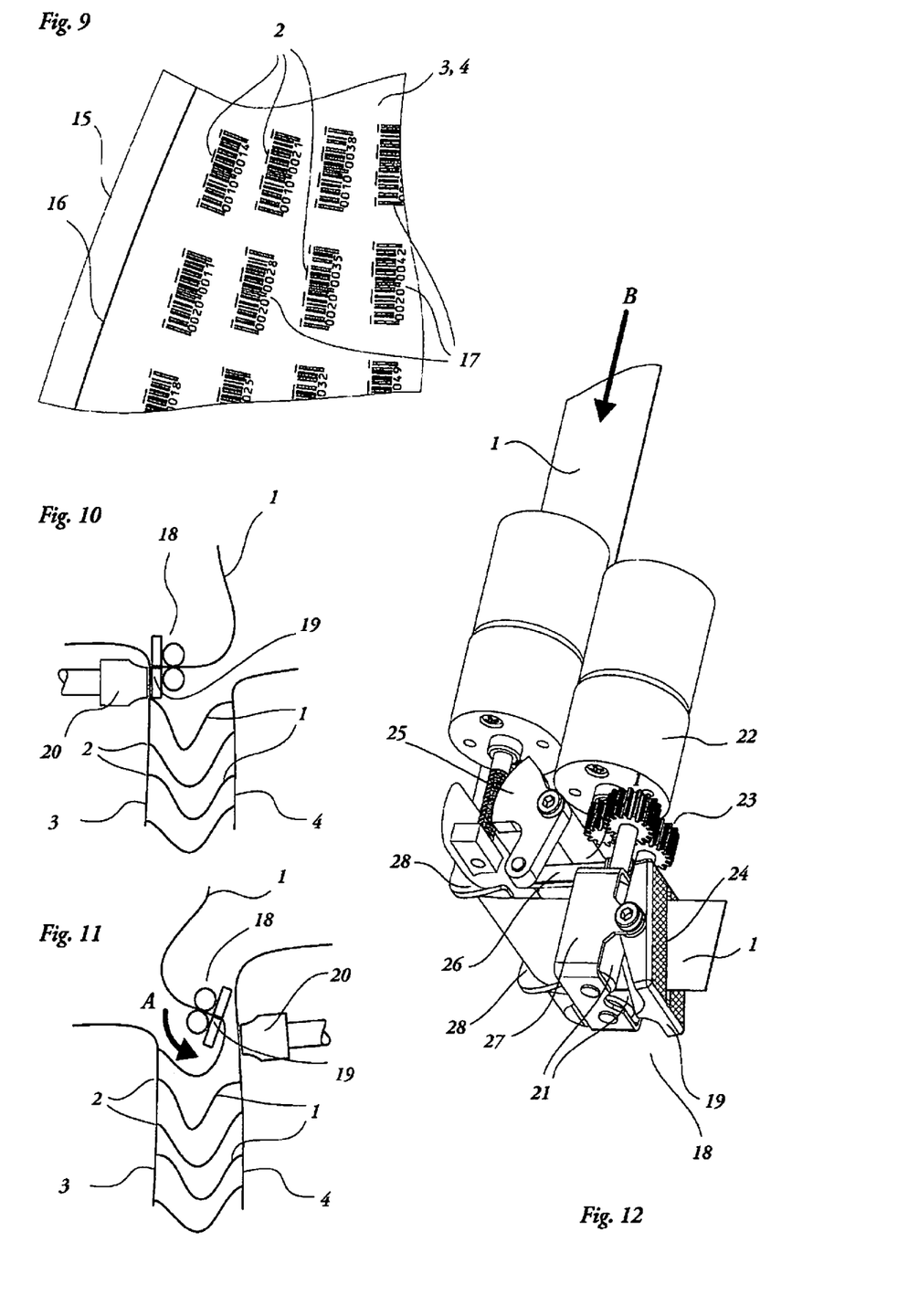
FIG. 9 depicts a portion of membrane printed with contour curves and a plurality of coded position marks for bond lines.
FIGS. 10 and 11 depict two steps of a tape positioning head equipped with a dual anvil feeding and positioning link tape to bond line locations on opposing membranes, working with a bond activating head.
FIG. 12 depicts essential parts of a motorized link tape positioning head with pinch rollers and dual anvil with motorized inclination angle adjustment.

FIG. 9 depicts a portion of a membrane 3 or 4 printed with contour curves 15, 16 and a plurality of coded position marks 17 for bond lines 2. Contour curve 15 defines the cutting line of the membrane, while contour curve 16 defines a join line of the membrane portion, for instance to join with one or more adjacent membrane portions to form a composed membrane 3 or 4 that approximates a double curvature face of an inflatable body according to the invention, or to join to an adjacent membrane portion if the desired inflatable body size exceeds that of stock material, or the span of a manufacturing means. Two contour curves 16 on opposing membranes 3 or 4 can also be joined to form an edge of an inflatable body according to the invention, for instance the leading edge of a wing, or the gunwale of an inflatable hull. Coded position marks 17, here depicted as computer readable bar-codes combined with human readable numbers, are in this figure combined with a dotted line that indicate the exact position of the bond lines 2 belonging to each code. Human readable codes can be desired for quality assurance purposes, or manual assembly or repair.

As the codes are printed on the membrane material, a robotic arm fitted with means for positioning or bonding link tape, and an optical sensor capable of reading a coded position mark and the position and orientation of a bond line 2 belonging to said code, can return information to the robotic arm control system to aid exact positioning and bonding of a link tape 1 to a membrane 3 or 4.

FIGS. 10 and 11 depict two steps of a tape positioning head 18, as part of a means for a manufacturing process according to the invention, equipped with a dual anvil 19, for feeding and positioning link tape 1 to bond line 2 locations on opposing membranes 3 and 4, working with a bond activating head 20 as yet another part of said manufacturing means, present on the outside of the assembly of link tape 12 and membranes 3 and 4 to assemble an inflatable body according to the invention.

In the step depicted in FIG. 10, a bond line 2 is being created by holding exactly positioned link tape 1 against membrane 3 by one of the two portions of a dual anvil 19 and a bond activating head 20, which is then activated. Exact positioning in this case involves locating and aligning of a bond line 2 on both link tape 1 and membrane 3, in accordance with the local inclination $\alpha$ from FIG. 2. Location and alignment may be assisted by an interplay of coded position marks 17, an optical sensor and a computer controlled robotic arm as described in the above FIG. 9. In order to assure bond activating head 20 assumes the exact position relative to the membrane 3 and tape positioning head 18, said optical sensor is preferably fitted to bond activating head 20 as it is situated on the outside of the inflatable body being assembled, therefore having its view unobstructed by already bonded link tapes. A second interplay of proximity sensors and computer controlled robotic arms can steer tape positioning head 18 and bond activating head 20 to their exact locations and orientations to form a bond line 2 with the desired exact location on both membrane 3 and link tape 1.

Bond activation may occur by applying heat through thermal transfer, friction or vibration energy to fuse material in a welding process, or by activating a chemical bond curing reaction by heat or UV light, or another process, not limiting the scope of the invention. Even though piercing options are present by way of stitching of riveting, it must be noted that piercing the membranes 3, 4, may introduce leaks in the inflatable body, which, for inflatable bodies operating at higher pressures, is highly unwanted. Especially for lower pressure operation, such as ram-air wings, stitching can be considered. In case stitching is chosen as bonding method, tape positioning head 18 and bond activation head 20 can respectively be fitted with needle and bobbin assemblies to form a sewing means.

As tape positioning head 18 moves to the next bond line location as a next step depicted in FIG. 11, it approximately makes a half turn in the direction that has the link tape feed side of the tape positioning head away from the previously assembled link tape, as indicated by arrow A, which as a result presents the other of the two portions of the dual anvil 19 to the membrane 4. During said movement, an exact length of link tape 1 is fed through the dual anvil, and the dual anvil assumes an angle β, as depicted in FIG. 2, relative to the link tape 1 center line. Now bond activation head 20 is present on the outside of membrane 4 to work with tape positioning head 18 to form a new bond line 2. To persons skilled it the art it is obvious that adding a second bond activation head on a third robotic arm, with each bond activation head dedicated to one of the membranes 3 or 4, considerably improves assembly speed.

FIG. 12 depicts essential parts of a motorized link tape positioning head 18 with pinch rollers 21 and dual anvil 19 with motorized inclination angle adjustment. It must be noted that in this figure, the chassis is largely removed to show said essential parts.

The pinch rollers 21 are driven by a feed motor 22 and synchronized in opposing rotation directions by a synchronizing assembly, herein depicted as a set of gears 23. As it is of great importance that the pinch rollers have minimal to no slippage on the link tape 1, the roller material, surface texture, hardness and compression have to be securely matched with the tape surface to avoid said slippage. The dual anvil 19 consists of two flat portions to each side of a tape slot 24 of sufficient width to let the link tape 1 through freely. In case of an assembly method as depicted in the previous FIGS. 10 and 11 each flat portion of dual anvil 19, here shown with cross hatches, is alternately used to create a bond line 2 as the tape positioning head 18 makes a half turn when moving from one opposing membrane to the other. Dual anvil 19 is further tiltable to adapt a desired inclination by means of a motorized angle adjustment assembly, here shown as a worm gear 25 driving a connecting rod 26 connected to one side of dual anvil 19. Dual anvil 19 is tiltably mounted on the same chassis part 27 that encases the pinch rollers.

The flat portions of dual anvil 19 may be provided with a knurled surface, that, in concert with a matching knurl on bond activation head 20, improves bond line 2 strength and/or activation speed. Link tape 1 is guided into tape positioning head 18 by an angled guide 28, and is along arrow B continuously supplied from a reel located away from the tape positioning head 18. By entering the tape feed angular to tape head 18 the tape and its guides are not obstructing the movement of tape positioning head 18 when it is working to assemble link tape 1 between opposing membranes 3 and 4.

As FIG. 12 has no mention of scale, for viewers it may be difficult to assess the width and thickness of link tape 1. These will vary widely between different applications of the inflatable bodies built according to the invention. A very light pressurized inflatable body according to the invention with a pressure of only 0.1 bar, such as a kite, may for instance have link tapes as narrow as 5 millimeters and a very light composition of only 30 Denier. An inflatable body according to the invention operated at a much higher pressure of over 1 bar, for instance a stand up paddle board, can have link tapes as wide as 25 mm and a 250 Denier composition. It should be noted that fabric composition for both link tapes along with the density of the link tape distribution can be optimized to the desired mix for acceptable surface smoothness, weight and manufacturing costs. Conclusively, different tape positioning head 18 designs can be made to match a variety of link tape 1 properties. It can be desired to apply multiple widths and compositions of link tape 1 in a single assembly. In such cases multiple tape positioning heads can be present on a manufacturing means according to the invention.

Figures 13, 14:
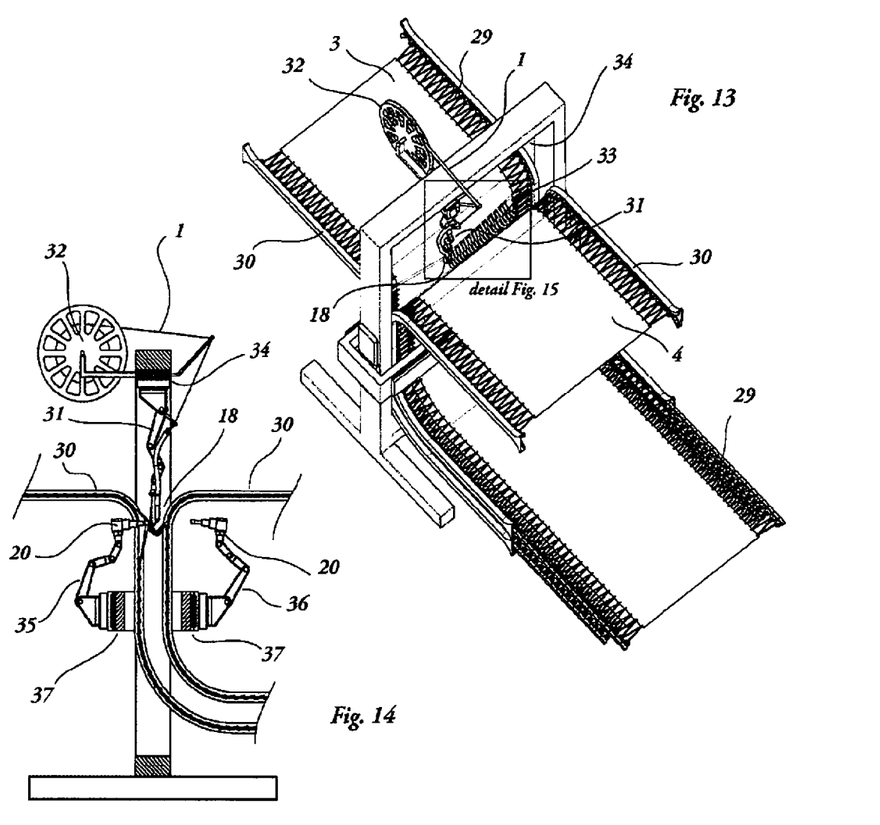
FIG. 13 provides and overview of a manufacturing means for automated assembly of an inflatable body, showing membrane suspension and feed tracks, as well as a robotic arm fitted with a link tape positioning head, a link tape feed reel and a partially assembled plurality of link tapes.
FIG. 14 depicts a cross sectional view of the manufacturing means from FIG. 13, further showing an outside robotic arm fitted with a bond activation means ready to engage in bonding a section of link tape to one of the opposing membranes, and another outside robotic arm fitted with a bond activation means in idle state.

FIG. 13 provides and overview of a manufacturing means for automated assembly of an inflatable body, showing membranes 3, 4, suspension 29 and feed tracks 30, as well as a robotic arm 31 fitted with a link tape positioning head 18, link tape feed reel 32 and a partially assembled plurality of link tapes. The embodiment depicted here has robotic arm 31 and link tape reel 32 mounted to a car movable along a track 34 running across the assembly area of link tape 1 to membrane 3, 4. The suspension 29 of membranes 3 and 4 in this embodiment is an arrangement of elastic elements and cars running inside feed tracks.

As one can see from this figure, the orientation of the assembly area is arranged such, that link tapes already assembled sag between the opposing membranes 3, 4, therewith minimizing the chance of obstructing the assembly process.

FIG. 14 depicts a cross sectional view of the manufacturing means from FIG. 13, further showing a robotic arm 35 fitted with a bond activation means 20 ready to engage in bonding a section of link tape to one of the opposing membranes, and another robotic arm 36 fitted with a bond activation means 20 in idle state. Both robotic arms 35, 36 are mounted to cars to run in tracks 37 parallel to track 34.

Figure 15:
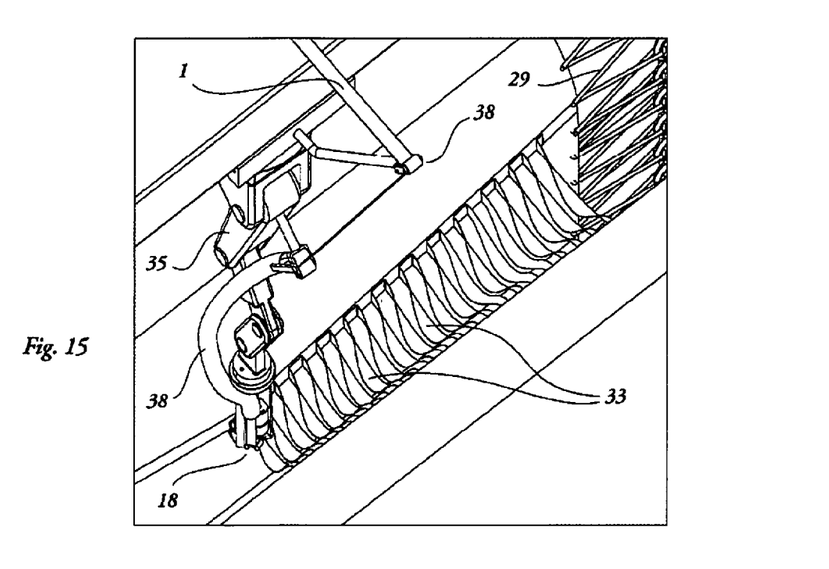
FIG. 15 depicts a detail view of the manufacturing means from FIG. 13, of the link tape positioning head doing its work.

FIG. 15 depicts an enlarged detail view of the manufacturing means from FIG. 13, of the link tape positioning head 18 doing its work. Tape managing means 38 are in place to deliver the tape from reel 32 to the tape positioning head 18 unfolded and wrinkle free.

The invention claimed is:

1. A process for manufacturing free form inflatable bodies, comprising:
   providing two opposing membranes to be hermetically bonded to each other or to other parts of an assembly at their circumference to form an inflatable chamber;
   providing a feed of continuous link tape to source a plurality of link tapes of varying lengths;
   calculating a link tape distribution with a computer algorithm to be applied for feeding, positioning and bonding of each individual link tape;
   feeding precise lengths of the link tape using a motorized link tape positioning head with pinch rollers; and
   a bond line activation of the feed of continuous link tape to said opposing membranes to form said plurality of link tapes of varying lengths and to internally link said membranes by the plurality of link tapes of varying lengths, such that each of the link tapes is at both ends bonded to one of said opposing membranes at a bond line in a distribution pattern according to the calculated link tape distribution, to allow the inflatable body to assume a desired exact and smooth complex curvature, and a predetermined rigidity upon inflation.

2. The process for manufacturing free form inflatable bodies according to claim 1 wherein opposing membranes are assembled from multiple panels prior to bonding of the link tapes, in order to achieve an approximation of a desired double curvature shape of the inflatable body.

3. The process for manufacturing free form inflatable bodies according to claim 1, wherein the link tape is corrugated between the opposing membranes with at least one bond line to one of said membranes at each nadir, and at least one bond line to the other one of said membranes at each apex, with the link tape sections between two bond lines on opposing membranes assuming a straightened shape upon inflation.

4. The process for manufacturing free form inflatable bodies according to claim 3, wherein the corrugated link tape has two bond lines at a nadir or apex to allow for any of the following: an increment of the number of bond lines, an inclined membrane surface, or a different planar orientation on a membrane, with the distance between these two bond lines used to fold a slack length of excess link tape.

5. The process for manufacturing free form inflatable bodies according to claim 1, wherein linking said membranes is accomplished with an assembly means having a first inside robotic arm able to reach inside faces of the opposing membranes, which first robotic arm is fitted with the tape positioning head and a bond means capable of establishing a bond line between the link tape and the opposing membranes according to numerical instructions, and is further equipped with one or more of the following: an optical sensing means, a proximity sensing means, a tape feeder and adjustment means for adaption of the bond line angle relative to a tape center line, and a tape cutter.

6. The process for manufacturing free form inflatable bodies according to claim 5 wherein the tape positioning head makes approximately half turns back and forth to move between a created bond line on one of two opposing membranes to a next bond line creation position on the other one of the opposing membranes.

7. The process for manufacturing free form inflatable bodies according to claim 5, wherein the assembly means has a second collaborating outside robotic arm able to reach outside faces of the opposing membranes, equipped with one part of a bonding system comprising a bond activation means and a counter pressing anvil, while the inside robotic arm is equipped with the other part of said bonding system.

8. The process for manufacturing free form inflatable bodies according to claim 7, wherein the assembly means has a third, also outside, robotic arm, allowing each outside robotic arm to be dedicated to one of the opposing membranes.

9. The process for manufacturing free form inflatable bodies according to claim 7, further comprising assembling the plurality of link tapes in a horizontally layered fashion to allow slack, previously bonded link tapes to sag out of the way of the robotic arms.

10. The process for manufacturing free form inflatable bodies according to claim 5, wherein the assembly means is provided with multiple tape positioning heads with differing tape properties.

11. The process for manufacturing free form inflatable bodies according to claim 1, wherein at least one of the opposing membranes has been provided with computer readable printed patterns for any one or more of the following: circumferential cutting lines and bonding seams, reference grids and identifying and positioning markers for the bond lines of the link tapes.

12. The process for manufacturing free form inflatable bodies according to claim 1, further comprising: tensioning the opposing membranes during assembly in order to provide stable positioning for bonding the link tapes to said opposing membranes.

13. The process for manufacturing free form inflatable bodies according to claim 1, further comprising building the inflatable body as sections that are subsequently assembled to form the inflatable body, in order to build inflatable bodies of size unlimited by stock membrane material or assembly means width and/or to build inflatable bodies with multiple chambers that can be pressurized differently.

14. The process for manufacturing free form inflatable bodies according to claim 1, wherein link tapes adjacent to internal parts of the assembly have increased lengths to partially wrap around the internal parts to prevent local bulging caused by under-supported areas of the opposing membranes upon inflation.

15. The process for manufacturing free form inflatable bodies according to claim 1, wherein the link tape distribution pattern is calculated taking into account parameters for exact coordinates for positions of the bond lines, planar orientation, angle offsets of the bond lines, as well as membrane offset distance and inclination, wherein said parameters are numerically applied during feeding, positioning and bonding of each individual link tape.

16. The process for manufacturing free form inflatable bodies according to claim 1, further comprising a dual anvil.

17. The process for manufacturing free form inflatable bodies according to claim 16, wherein the motorized link tape positioning head comprises the dual anvil.

* * * * *